Patented Jan. 19, 1932

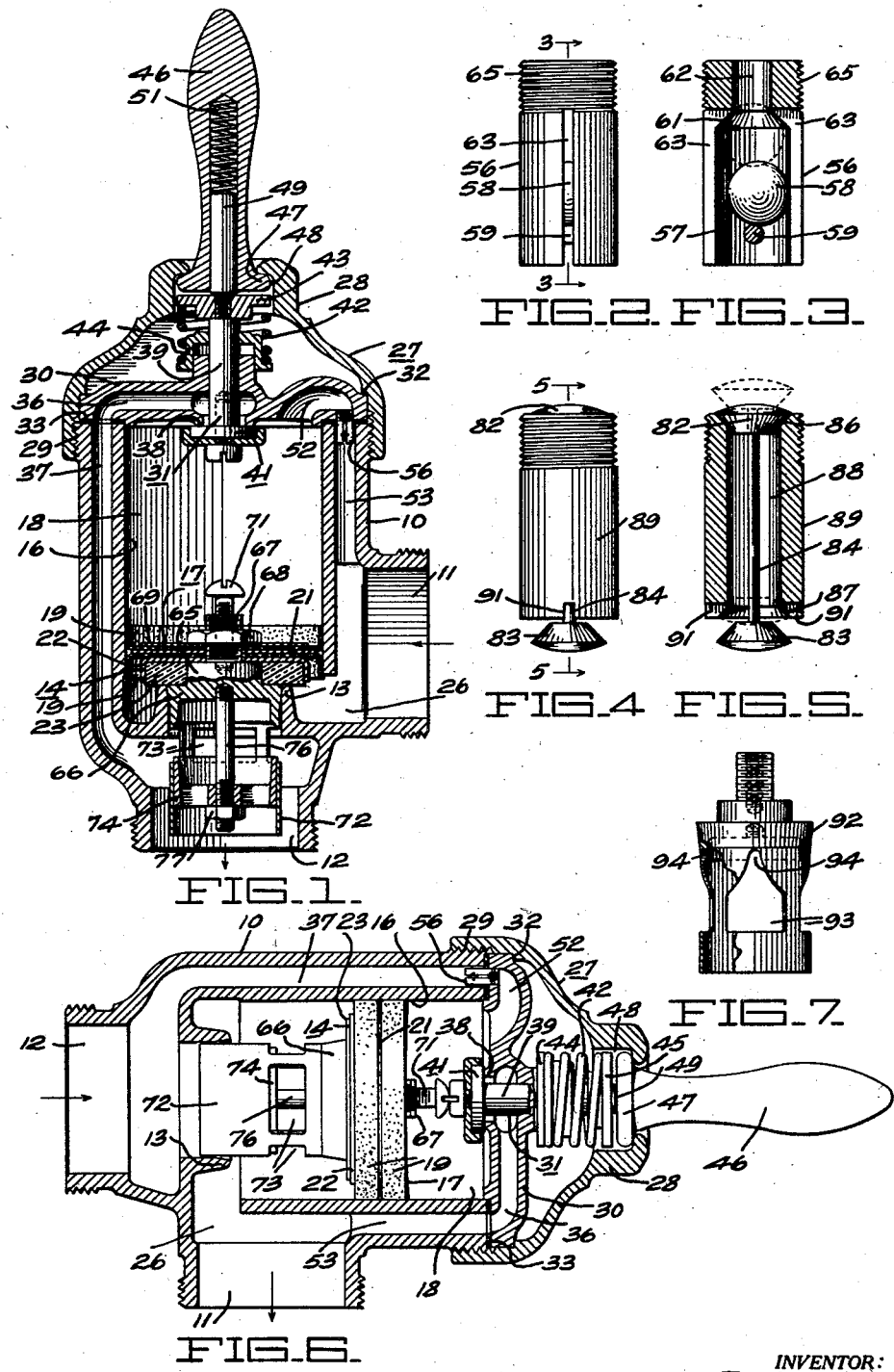

1,841,456

UNITED STATES PATENT OFFICE

REGINALD C. SHAND, OF BERKELEY, CALIFORNIA, ASSIGNOR TO SHAND & JURS COMPANY, OF BERKELEY, CALIFORNIA, A COPARTNERSHIP CONSISTING OF REGINALD C. SHAND AND ALBERT E. JURS

FLUSH VALVE

Application filed July 3, 1929. Serial No. 375,825.

This invention relates generally to the construction of valves for controlling flow of fluid, and particularly to valves of the flush type which are operated by fluid pressure.

In the construction of flush valves, it has been common to utilize a piston, plunger, or equivalent means operated by pressure in a fluid chamber, and which in turn opens and closes a movable valve member. A pilot valve actuated externally of the main valve casing, serves to exhaust fluid from the chamber, thus causing the valve member to move to open position, and the chamber also has restricted communication with the inflow side of the valve whereby fluid pressure can build up in the chamber to cause subsequent closing movement of the valve member. Various forms of restricted ports or orifices have been employed for controlling flow of fluid from the inflow side of the valve to the fluid chamber, to secure proper valve action. The apertures through these orifices are relatively small, and it is common for them to become obstructed or clogged by sediment or foreign material in the fluid, thus hindering proper operation of the valve, or making the valve entirely inoperative. Valves of the prior art have also been objectionable in that they frequently shut off too suddenly, thus causing "water hammer". It is commonly appreciated that water hammer in the operation of a flush valve is to be avoided, both because of the noise which it occasions and because of the detrimental effect upon the associated plumbing.

It is an object of the present invention to devise a flush valve of the above character which will not be detrimentally effected by sediment or by foreign material in the water, and which will therefore operate over long periods without repairs or replacements. It is characteristic of my invention that communication is established between the fluid chamber and the inflow side of the valve thru a novel form of orifice, which is automatically enlarged when the valve is in normal closed position.

It is a further object of this invention to devise a flush valve which will not close so abruptly as to cause water hammer, irrespective of the pressure of fluid upon the inflow side.

It is a further object of this invention to devise a novel form of flush valve in which by a simple shifting and reassembling of parts, the connections to the inflow and outflow pipes can be reversed.

Further objects of the invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view in cross section, illustrating one form of my invention.

Figure 2 is a side elevational view of a by-pass orifice incorporated in the valve of Figure 1.

Fig. 3 is a cross sectional view taken along the line 3—3 of Fig. 2.

Fig. 4 is a side elevational view of a by-pass orifice of modified construction.

Fig. 5 is a cross sectional view taken along the line 5—5 of Fig. 4.

Fig. 6 is a cross sectional view of a completed valve, showing the arrangement of parts for reversing connections to the inflow and outflow passages. The valve member in this case is also shown in open position.

Fig. 7 is a side elevational view in detail, partly in cross section, illustrating the structure depending from my movable valve piston or plunger, for throttling flow of fluid as the valve member approaches closed position.

That form of my invention illustrated in Fig. 1 includes a casing formed in part by a valve body 10, constructed of suitable material such as a metal casting, and having inflow and outflow passages 11 and 12. Passage 11 is adapted for connection with a source of fluid under pressure, such as a water supply pipe, while passage 12 is adapted for connection with the pipe or plumbing fixture to which water or other fluid is to be supplied. Formed within the valve body, there is a valve seat 13 which is preferably annular, and which is adapted to cooperate with a movable valve member designated generally at 14. When valve member 14 is unseated or in open position, fluid can flow from passage 11, thru the interior of valve seat 13, to the outflow passage 12.

A cylindrical bore 16 is formed within the valve body, and within this bore there is fitted a fluid plunger or piston 17. The space within the bore 16 and above piston 17, forms a fluid chamber 18. Piston 17 can be of any conventional construction which will form a comparatively fluid tight fit with the cylinder bore 16. For example it can be formed of a pair of oppositely faced flexible cup washers 19, between which is interposed a metal washer 21. Piston 17 can be directly connected with movable valve member 14, and to afford a simple construction, I have shown it formed of a metallic cup shaped member 22, retaining a seating ring 23, made of suitable resilient material such as rubber. Cylinder bore 16 below piston or plunger 17, has unrestricted communication with passage 11, thru opening 26.

Fluid chamber 18 can be placed in communication with passage 12 for exhausting fluid from the same, and also has restricted communication with passage 11, in order to force piston 17 and valve member 14 toward closed position. The preferred manner of providing such communication is to utilize a separate head structure 27. This head preferably includes a suitable fitting 28 having detachable connection with the body member 10, as by means of threaded engagement 29. Extending across the upper end of cylinder bore 16, there is a member 30 serving as a closure for the upper end of the body, and which supports a pilot valve 31. For retaining member 30 in proper position, I have shown its marginal or peripheral portions engaged by shoulder 32 formed on the fitting 28, and a suitable gasket 33 imposed between member 30 and body member of the valve, provides a sealed engagement.

For establishing communication between chamber 18 and passage 12, member 30 is shown provided with a port or duct 36 adapted to register with a port 37 formed in the valve body. Port 37 communicates with the passage 12, below the valve seat 13. Port 36 has controlled communication with chamber 18, thru an annular valve seat 38. To provide a conventional form of pilot valve, I have shown a stem 39 slidably fitted in member 30, and carrying a valve member 41 adapted to cooperate with valve seat 13. A compression spring 42 or equivalent means is provided for normally urging the pilot valve toward closed position, one end of this spring being shown seated upon a disc 43 secured to the upper end of stem 39, while the other end is seated upon a cup shaped ring 44, carried by member 30. The pilot valve can be opened by suitable means such as an external manual handle 46, having its inner end provided with an annular flange 47, this flange being positioned within a recess 48. Movement of handle 46 to one side in any direction serves to force down disc 43, and accordingly to disengage valve member 41 from seat 38. As novel means for normally retaining handle 46 in upright position, I have shown a plunger 49 slidably positioned within the handle, and urged outwardly by a compression spring 51. The lower end of plunger 49 presses against the upper surface of disc 43, thus causing the handle to return to its normal vertical position irrespective of the space between the lower end of the handle and the upper surface of disc 43.

Communication between chamber 18 and the inflow passage 11 is established by means of a port 52 formed in member 30 which is adapted to normally register with a port 53 formed in the valve body 10.

In place of utilizing an orifice having a fixed opening for restricting flow of fluid thru ports 52 and 53, I preferably utilize an orifice device constructed as shown in Figs. 2 and 3. In this instance I have shown a body 56, having a bore 57 within which is loosely disposed a sphere or metallic ball 58. Ball 58 is retained within the bore 57 by suitable means such as a small retaining pin 59, and in one position is adapted to cooperate with an annular seat 61. Seat 61 together with ball 58, is adapted to control flow of fluid from bore 57, thru the outflow opening 62. Seat 61 is preferably constructed in such a way that when ball 58 is in contact with the same, a certain predetermined restricted flow of fluid can still occur from bore 57 to opening 62. For example the seat 61 can be interrupted to a limited extent by one or more slots 63 formed within body 56. When ball 58 has fallen away from seat 61, flow between bore 57 and opening 62 is practically unrestricted, and therefore the orifice opening provided by the device of Figs. 2 and 3 can be said to be practically unrestricted at this time. However when a substantial flow of fluid occurs thru the device, ball 58 is forced against seat 61, and then the orifice is made relatively small, depending upon the width and extent of slots 63. In practice this orifice device is provided with a threaded portion 65 so that it can be mounted upon member 30 to control flow thru ports 52 and 53.

The complete operation of my valve will be subsequently reviewed, but it can be pointed out at this time that operation of handle 46 to open pilot valve 31, causes fluid to be exhausted from chamber 18, thru ports 36 and 37, to the outflow passage 12, thus relieving the pressure within chamber 18 and causing the fluid pressure from passage 11 to move piston 17 upwardly. At the same time flow of fluid thru port 53 forces ball 58 against seat 61, so as to provide restricted communication between inflow passage 11 and chamber 18. When the pilot valve is permitted to close, fluid gradually accumulates within chamber 18, thus forcing piston 17 downwardly again to effect subsequent closure of the valve. As has been previously mentioned, in flush valves of the prior art, the last portion of the closing movement is too sudden, thus causing water hammer, particularly when the inflow pressure is relatively high.

In order to prevent too sudden closure of the valve, I have shown a member 66 carried by the valve member 14 and this member 66 preferably has a downwardly tapered outer periphery as shown. To form a convenient and simple unit of the member 66 and its associated moving parts, member 66 is shown provided with an integral stud 65 about which the seating ring 23 is positioned. A threaded portion 67 extends upwardly from stud 65, and is engaged by a nut 68 for clamping the cup washers 19, metallic cup 22 and seating ring 23 in assembled relationship upon member 66. A suitable metallic washer 69 can be interposed between nut 68 and the upper cup washer 19. As an adjustable stop to limit upward movement of piston 17, I have shown a screw 71 threaded into portion 67, and serving to engage the lower end of pilot valve 31 when the piston is in fully raised position.

When valve member 14 approaches its closed position, member 66 enters the opening provided by annular seat 13, thus tending to gradually restrict flow of fluid between passages 11 and 12. The restriction to the flow is gradually increased as valve member 14 approaches closed position, due to the tapered construction of member 66. As will be presently explained, this construction not only prevents water hammer by gradually throttling flow of fluid between passages 11 and 12 as the valve member 14 approaches closed position, but throttling of the flow by member 66 causes pressure to build up or increase in passage 11 and beneath piston 17, thus tending to slow down the last portion of the movement of the valve member.

With a valve of the character described above, it is desirable to provide an adjustment to accommodate the valve to various fluid pressures. A suitable means consists of a sleeve 72 depending from member 66, and having openings or ports 73 formed in the same. A hollow annular member 74 is fitted within sleeve 72, and has a threaded engagement with rod 76, this rod being secured to and depending from member 66. A nut 77 threaded upon rod 76, determines the position of member 74, and by turning this nut in either direction, the effective opening thru port 73 can be restricted or enlarged as desired. For operating or relatively high fluid pressures, ports 73 are effectively restricted by screwing up nut 77 and correspondingly when operating upon low fluid pressures, nut 77 is unscrewed to effectively increase the flow thru ports 73. When valve member 14 is in full open position, as shown in Fig. 6 sleeve 72 still extends within the valve seat 13, so that the major portion of the fluid flow occurs thru ports 73.

To review operation of the valve as described above, pilot valve 31 is normally closed, and piston 17 is in the position shown in Fig. 1 to retain the valve member 14 tightly upon the annular seat 13. Both the lower and upper portions of piston 17 are exposed to fluid pressure in passage 11, but since the effective area disposed upon the lower side of the piston is relatively small, an unbalanced condition exists tending to force the piston downwardly or towards seat 13. Since practically no fluid flow normally occurs thru port 53 from the inflow passage 11, ball 58 is away from its seat 61, thus obviating accumulation of sediment or foreign material in that portion of slot 63 adjacent seat 61. To effect operation of the valve, the operator forces handle 46 to one side, thus opening pilot valve 31 and permitting fluid from chamber 18 to exhaust thru ports 36 and 37 to the outflow passage 12. Thus pressure in chamber 18 is immediately reduced, and the line pressure on the under side of piston 17 is sufficient to raise the piston and valve member 14. Opening movement of piston 17 and the valve member is limited by engagement of screw 71 with the lower end of pilot valve 31, as shown in Fig. 6 and the piston will remain in this position as long as the pilot valve is retained open. Simultaneous with opening of the pilot valve reduction of fluid pressure in chamber 18, a flow of fluid occurs thru ports 52 and 53, and this flow immediately forces ball 58 against the seat 61, thus providing restricted communication between the inflow passage and the interior of chamber 18. When handle 46 is released and pilot valve 31 permitted to close, pressure immediately builds up in chamber 18 because of the restricted flow through ports 52 and 53, thus causing piston 17 to move towards its closed position. During the last portion of the movement of piston 17, tapered member 66 enters valve seat 13, and substantially restricts or throttles the flow fluid between passages 11 and 12, thus causing pressure to build up in the inflow passage 11 and correspondingly slowing down the movement of the piston. The piston continues its movement and gradually assumes complete closed position, with seating ring 23 pressed against the valve seat 13. After the piston has completed its movement toward closed position, no further flow of fluid occurs thru ports 52 and 53, and thus ball 58 falls away from its seat 61, thus exposing the slots 63 and causing any sediment or foreign matter which may have accumulated in the same, to be removed.

In connection with the above described structure, it is to be noted that automatically controlled orifice described with reference to Figs. 2 and 3, can be imposed at any desirable point between inflow passage 11 and chamber 18. When the orifice device is threaded into the position shown in Fig. 1, it normally projects downwardly into port 53. It is to be noted that the upper portion of port 37 is sufficiently large in diameter to likewise accommodate body 56. It is therefore possible for member 30 to be clamped upon the body 10 in a position rotated 180 degrees from the position shown in Fig. 1. Such a positioning is shown in Fig. 6, in which event the orifice controls flow of fluid from passage 12 to the chamber 18. By means of such an assembly of parts, the valve may be operated with passage 12 constituting the inflow passage and being connected with a source of fluid pressure, while passage 11 constitutes the outflow passage.

A modified form of the orifice device is shown in Figs. 4 and 5. In this case, in place of the single ball 58, I have shown upper and lower valve members 82 and 83 connected by a stem 84. These valve members are adapted to cooperate with upper and lower valve seats 86 and 87, so as to control flow thru opening 88 of the body 89. Seat 87 is interrupted by one or more slots 91, thus forming a restricted orifice when valve member 83 is in engagement with its seat 87. The operation of this device is practically the same as that shown in Figs. 2 and 3. Upon operation of the main valve, fluid pressure tends to lift valve members 82 and 83, to restrict the flow thru slots 91. When the main valve returns to closed position, valve member 83 drops away from its seat to expose slot 91, thus permitting any sediment to drop away and preventing accumulation of sediment within the slots, while valve member 83 engages its seat to prevent sediment or foreign material above the same from depositing upon the upper side of valve member 83 and adjacent the slot 91.

In Fig. 7 I have shown modified means for preventing too sudden closing of the valve member. In this event member 92 is tapered similar to member 66 of Fig. 1, but in addition thereto, ports 93, corresponding to ports 73 of Fig. 1, have portions 94 of reduced width extending upwardly from the same. With a structure of this character, as the valve member approaches closed position, flow of fluid about the valve seat thru ports 93 is gradually restricted due to the decreasing width of port portions 94, and this effect, added to the throttling effect of tapered member 92, tends to prevent sudden closure with its resultant water hammer.

I claim:

1. A valve comprising a casing having inflow and outflow passages for flow of fluid, a valve member for controlling flow of fluid thru said passages and movable to open or closed positions, and fluid means for causing opening of the valve member followed by automatic closing, said means including a fluid pressure chamber, a port for normally establishing substantially free communication between the inflow passage and said chamber, and means for automatically restricting said port during closing movement of the valve member and for effectively enlarging said port while the valve member is in normal closed position.

2. A valve comprising a casing having inflow and outflow passages for flow of fluid, a valve member for controlling flow of fluid thru said passages and movable to open or closed positions, and fluid means for causing opening of the valve member followed by automatic closing, said means including a fluid pressure chamber, a port for normally establishing substantially free communication between the inflow passage and said chamber, and fluid operated means for automatically restricting said port during closing movement of the valve member and for effectively enlarging said port while the valve member is in normal closed position.

3. A valve comprising a casing having inflow and outflow passages for flow of fluid, a valve member for controlling flow of fluid thru said passages and movable to open and closed positions, and fluid means for automatically closing the valve member after opening of the same, said means including a fluid pressure chamber, a port for normally establishing substantially free communication between the inflow passage and said chamber, an orifice thru which fluid passing thru said port must flow, and a member movable by a rush of fluid thru the port to throttle said orifice during closing movements of the valve member and movable automatically to a position in which the orifice is substantially unobstructed when the valve member is closed and substantially free communication exists to the chamber from the inflow passage.

4. A valve comprising a casing having inflow and outflow passages for flow of fluid, a valve member for controlling flow of fluid through said passages and movable to open or closed positions, and fluid means for causing opening of the valve member followed by automatic closing, said means including a fluid pressure chamber, a port for normally establishing substantially free communication between the inflow passage and said chamber, and a ball provided in said port cooperatively with respect to a seat therefor, said ball being movable to automatically restrict said port during closing movement of the valve member and automatically to enlarge said port when the valve member is in normal closed position so that a substantially free fluid passage exists between the inflow passage and the fluid pressure chamber.

5. A valve comprising a body member having two passages for connection with inflow and outflow pipes, a valve member within said body member movable from open to closed positions to control flow of fluid through the pasasges, means utilizing a fluid chamber for effecting opening and closing of the valve, a head member adapted to be removably secured to the body member, ports formed in the body member communicating respectively with the passages, a pilot valve mounted on said head, a port formed in the head adapted to communicate with one of the body ports whereby flow of fluid can occur through said last ports to said chamber under control of the pilot valve, another port in the head adapted to establish normally substantially free communication between the other body port and said chamber, and means for restricting flow through said last mentioned port in the head during closing of the valve member, said restricting means allowing a substantially free fluid passage through said port when the valve member is in closed position.

6. A valve comprising a casing having inflow and outflow passages for flow of fluid, a valve member for controlling flow of fluid thru said passages and movable to open or closed positions, and fluid means for causing opening of the valve member followed by automatic closing, said means including a fluid pressure chamber, a port for normally establishing substantially free communication between the inflow passage and said chamber, and means for automatically restricting said port during closing movement of the valve member and for effectively enlarging said port while the valve member is in normal closed position, said means including a tubular member adapted to be inserted in said port, said member including oppositely provided valve seats, a pair of oppositely provided valve members adapted to cooperate and seat upon their respective valve seats on the tubular member, a stem joining the valve member so that when one member is seated on a valve seat the other is separated from the seat, and a conduit providing a by-pass about one of the seats so that flow to the port is restricted during closing movement of the valve member.

In testimony whereof, I have hereunto set my hand.

REGINALD C. SHAND.